(12) United States Patent
Putnam

(10) Patent No.: US 9,969,335 B2
(45) Date of Patent: May 15, 2018

(54) VEHICLE LOAD ASSIST DEVICE

(71) Applicant: Ian Putnam, Santa Barbara, CA (US)

(72) Inventor: Ian Putnam, Santa Barbara, CA (US)

( * ) Notice: Subject to any disclaimer, the term of this patent is extended or adjusted under 35 U.S.C. 154(b) by 545 days.

(21) Appl. No.: 14/530,925

(22) Filed: Nov. 3, 2014

(65) Prior Publication Data
US 2016/0122131 A1 May 5, 2016

(51) Int. Cl.
*B60R 9/042* (2006.01)
(52) U.S. Cl.
CPC ................................ *B60R 9/042* (2013.01)
(58) Field of Classification Search
CPC .................................................. B60R 9/042
USPC ........................................ 414/462; 224/310
See application file for complete search history.

(56) References Cited

U.S. PATENT DOCUMENTS

| | | | | | |
|---|---|---|---|---|---|
| 2,613,020 | A * | 10/1952 | Berry | .................... | B60P 3/1025 224/310 |
| 2,663,474 | A * | 12/1953 | Kelly | ........................ | B60P 3/10 224/484 |
| 2,859,887 | A * | 11/1958 | Haight | .................... | B60R 9/042 193/42 |
| 3,709,413 | A * | 1/1973 | Nelson | ...................... | B60R 9/00 224/310 |
| 3,712,524 | A * | 1/1973 | Ames, Sr. | ............. | B60P 3/1025 224/310 |
| 4,452,385 | A * | 6/1984 | Prosen | ..................... | B60R 9/06 224/321 |
| 4,513,897 | A * | 4/1985 | Graber | ...................... | B60R 9/06 211/5 |
| 4,630,990 | A * | 12/1986 | Whiting | .................. | B60R 9/042 224/310 |
| 5,957,350 | A * | 9/1999 | Giles | ....................... | B60R 9/042 224/310 |
| 9,522,635 | B2 * | 12/2016 | Nusbaum | ................. | B60R 9/06 |
| 2010/0193555 | A1 * | 8/2010 | Gift | ........................... | B60R 9/08 224/321 |

* cited by examiner

*Primary Examiner* — Jonathan Snelting
(74) *Attorney, Agent, or Firm* — Loza & Loza, LLP; Heidi Eisenhut

(57) ABSTRACT

A vehicle load assist device and methods of making and using the same is described. According to one embodiment, the vehicle load assist device includes at least one support arm having a substantially open space between two ends configured to accept a corner of a vehicle, at least one wheel assembly, at least one slide, and at least one harness. The wheel assembly is coupled to the support arm and is a pivot point for loading an item onto a vehicle. The slide is coupled to one end of the support arm and configured to slide on a surface of the vehicle. The harness is coupled to the slide and configured to couple to the vehicle.

15 Claims, 7 Drawing Sheets

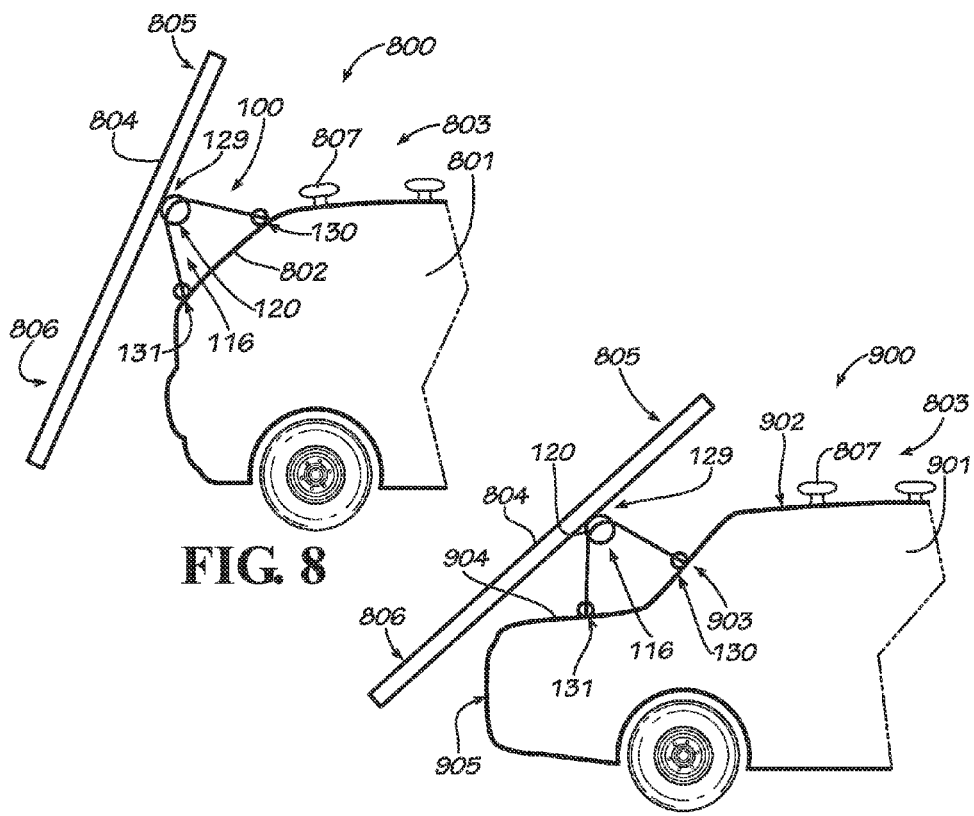
FIG. 8
FIG. 9
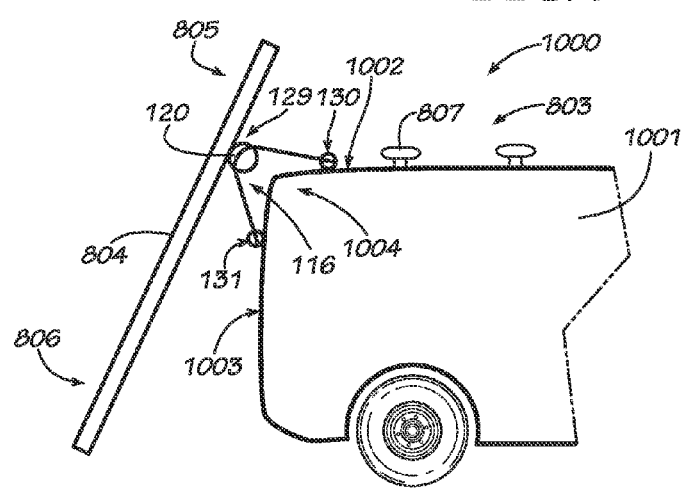
FIG. 10

VEHICLE LOAD ASSIST DEVICE

TECHNICAL FIELD OF THE INVENTION

The present invention is related to a device to load articles, particularly articles related to surf sports or boating, onto the roof of a vehicle

BACKGROUND

Oftentimes it is desirable to transport long, heavy, rigid items on the top of an automobile, particularly a vehicle or automobile equipped with a rack system on its roof. Items such as surfboards, paddle boards, kayaks, canoes, and small boats, for example, are suitable for transport on the top of a vehicle. However, the size, weight, and weight distribution make it difficult for an individual to lift the item safely to the top of the vehicle without damaging the item or the vehicle. Even with multiple individuals lifting the item, lifting and positioning the item can be a difficult task to accomplish.

Various attempts to aid a user to load such items to a vehicle rack have been proposed. Some current devices for placing items on the roof of a vehicle utilize suction cups to attach the device to the vehicle. The suction cups provide stability and prevent the device from moving during use. However, suction cups require a large amount of force to attach to the vehicle and hold the device in place while in use, which may cause damage to the painted surfaces or glass. The vacuum created by the suction cups or the pressure needed to attach them can cause the vehicle's metal panels to deform. To remove the device, the user must grasp and lift a lip of the suction cup, and in doing so can scratch the vehicle.

Other devices are attached to the bumper of a vehicle, to a hitch-type mechanism, or to the roof of a vehicle. These devices are typically bolted in place and at least a portion of the device is intended to remain attached to the vehicle. Some devices can further support the item while it is atop the vehicle. Even those devices that can be removed involve cumbersome methods to attach and remove the devices.

There currently exists a need for a vehicle load assist device to allow an individual to easily and safely place a long, heavy, rigid item atop a vehicle without damaging the item or the vehicle.

SUMMARY

An exemplary embodiment of the invention includes a vehicle load assist device having at least one support arm with two ends, a wheel assembly coupled to the at least one support arm between the two ends and having an outer periphery, at least one slide coupled to the at least one support arm, and at least one harness coupled to the at least one support arm. The at least one support arm is configured to have a substantially open space between the two ends for accepting a corner of a vehicle. The outer periphery of the at least one wheel assembly is a pivot point. The at least one harness is configured to couple to the vehicle and the at least one slide is configured to slide on the surface of the vehicle.

In other, more detailed features of the invention, one of the harnesses includes a hook. In another, more detailed feature of the invention, the wheel assembly is selected from the group consisting of wheels, casters, swivel casters, and rollers. In yet other, more detailed features of the invention, the vehicle load assist device can further include at least one transverse arm coupled to the at least one support arm. The transverse arm can be spaced a distance from the ends of the at least one support arm. In other, detailed features of the invention, the slide includes at least a portion of the at least one transverse arm.

In yet other, more detailed features of the invention, the at least one support arm includes at least one leg that has a length. The length of the at least one leg can be varied. In other more detailed features of the invention, the at least one harness has an end and the end is Y-shaped.

An exemplary method according to the invention is a method of manufacturing a vehicle load assist device. The method includes forming at least one support arm having two ends from a rigid material. The support arm having a substantially open space between the two ends for accepting a corner of a vehicle. The method also includes the steps of coupling at least one wheel assembly having an outer periphery to the at least one support arm between the two ends, coupling at least one slide to one end of the at least one support arm, and coupling at least one harness to the at least one support arm. The outer periphery of the wheel assembly is a pivot point, the at least one harness is configured to couple to the vehicle, and the slide is configured to slide on the vehicle.

In other, more detailed features of the invention, the method of making the vehicle load assist device further includes the steps of forming at least one transverse arm from a rigid material and coupling the at least one transverse arm to the at least one support arm.

An exemplary method according to the invention is a method of using a vehicle load assist device to place an item atop a vehicle equipped with a roof rack system. The method includes positioning the vehicle load assist device on the vehicle. The vehicle load assist device includes at least one support arm having two ends and a substantially open space between the two ends. The vehicle load assist device also includes at least one wheel assembly coupled to the at least one support arm between the two ends, the wheel assembly including an outer periphery, the outer periphery of the wheel assembly is a pivot point. The vehicle load assist device further includes at least one slide coupled to one end of the at least one support arm and at least one harness coupled to the at least one slide. The method further includes the steps of coupling the at least one harness to the roof rack system, tilting the item up such that a leading portion of the item engages the at least one wheel assembly, lifting a trailing portion of the item to pivot on the pivot point, pushing the item over the roof rack system while rolling the item on the wheel assembly, and lowering the item onto the roof rack system.

In other, more detailed features of the invention, the step of positioning the vehicle load assist device on the vehicle includes positioning a first end of the support arm adjacent to a first surface of the vehicle and positioning the second end of the support arm adjacent to a second surface of the vehicle such that a corner of the vehicle formed between the first and second surfaces of the vehicle is accepted into the substantially open space between the first and second ends of the support arm.

Other features of the invention should become apparent to those skilled in the art from the following description of the preferred embodiment(s) taken in conjunction with the accompanying drawings, which illustrate, by way of example, the principles of the invention, the invention not being limited to any particular preferred embodiment(s) disclosed.

BRIEF DESCRIPTION OF THE DRAWINGS

These and other features, aspects, and advantages of the present invention will become better understood with reference to the following description, appended claims, and accompanying drawings, where:

FIG. 8 is a side elevational view of the vehicle load assist device of FIG. 1 being used to load an item onto a hatchback-style of vehicle.

FIG. 9 is a side elevational view of the vehicle load assist device of FIG. 1 being used to load an item onto a sedan-style of vehicle.

FIG. 10 is a side elevational view of the vehicle load assist device of FIG. 1 being used to load an item onto an SUV-style of vehicle.

Unless otherwise indicated, the illustrations in the above figures are not necessarily drawn to scale.

DETAILED DESCRIPTION OF THE PREFERRED EMBODIMENTS

Figure 1A:
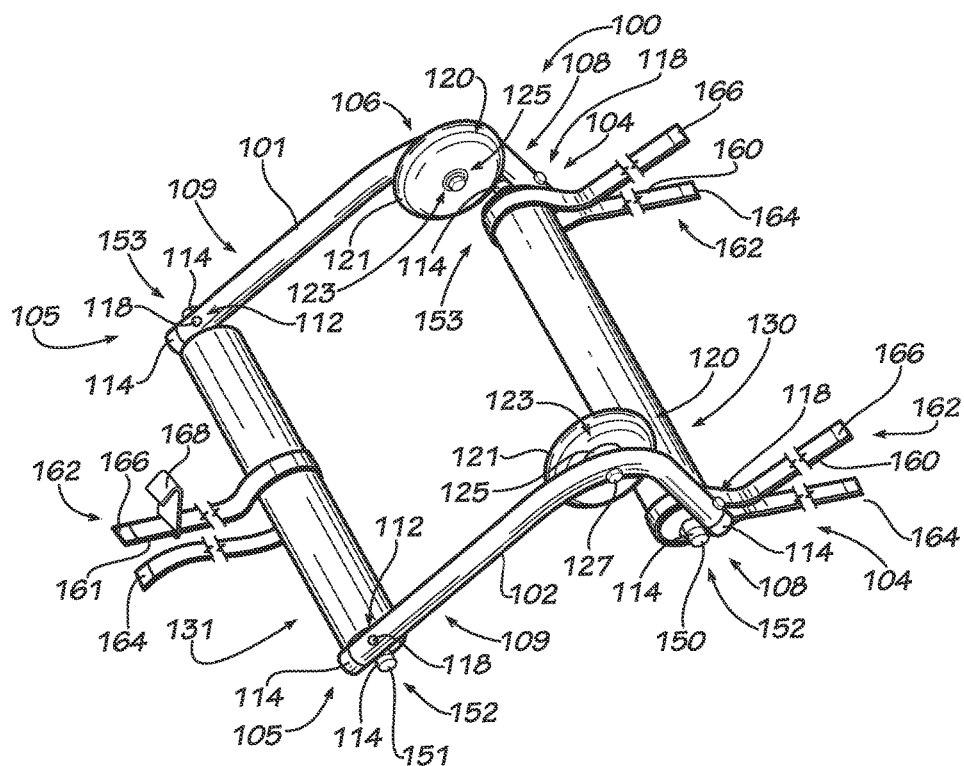
FIG. 1A is a perspective view of a first embodiment of a vehicle load assist device according to the present invention.

Referring to FIG. 1A, a vehicle load assist device according to a first embodiment of the invention is shown generally at 100. The device in this embodiment includes two support arms 101, 102, each with a first end 104 and a second end 105. The device also includes two slides 130, 131 coupled to the support arms that are configured to slide along a surface 802, 902, 903, 904, 905, 1002, 1003 of a vehicle 801, 901, 1001 (see FIGS. 8, 9, and 10). For purposes of this application, a "slide" is a portion of the device that is in contact with the vehicle, but that is not fixed to that point of contact, such that the portion of the device is capable of slideable engagement with that point of contact. Each slide transversely couples corresponding ends of the support arms. Each support arm has a wheel assembly 120 attached. Additionally, the device can include several harnesses 160, 161 for easy attachment to and removal from a vehicle.

Figure 1B:
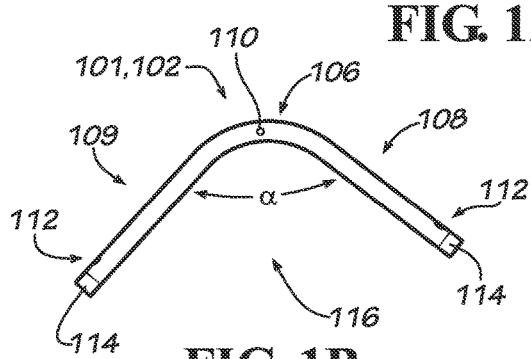
FIG. 1B is an elevational view of a support arm of a vehicle load assist device according to the embodiment of FIG. 1A.

In this embodiment, each support arm 101, 102 is constructed of ⅞ inches diameter galvanized steel pipe or other rigid material and is 25.5 inches long measured along the support arm from the first end 104 to the second end 105. In other embodiments, the support arm can be other materials, lengths, and diameters as discussed below. As can be seen in FIG. 1B, the support arm has a rounded bend 106 in the middle with a radius of curvature between approximately 2 inches and approximately 6 inches of causing the support arm to lie in a plane. In this embodiment, the radius of curvature is approximately 4 inches to 4½ inches. The support arm also includes two legs 108, 109, each leg extending from the rounded bend. The legs and the rounded bend may be formed of a single piece of material or may be multiple pieces fixed together. The legs form an angle $\alpha=90$ degrees with respect to one another. The support arm further includes a 5/16 inches diameter wheel hole 110 through the support arm and located equidistant from the ends of the support arm for attaching a wheel assembly 120. However, it is also within the scope of the invention for the wheel hole to be located closer to one end of the support arm than another. The wheel hole is perpendicular, or 90 degrees, to the plane of the support arm. Additionally, there is a ¼ inches diameter connection hole 112 located near each of the first and second ends of the support arm for connecting to transverse arms 150, 151. Each connection hole is through the support arm and approximately parallel to the plane of the support arm. However, it is also within the scope of the invention that the connection hole is other than approximately parallel to the plane of the support arm, and can be absent. The connection holes are positioned proximate to the first and second ends. In this embodiment, the connection holes are positioned 1 inch from the first and second ends. The ends of the support arms can be covered. For example, plastic caps 114 can be fitted over the ends or the ends can be dipped in a liquid or molten rubber or plastic material that solidifies when cool.

As described above, the legs 108, 109 of the support arm 101, 102 are formed at an angle $\alpha$ with respect to one another. Thus a portion of the support arm is substantially V- or U-shaped defining a substantially open space 116 between the legs. The substantially open space allows the vehicle load assist device 100 to contact different surfaces 802, 902, 903, 904, 905, 1002, 1003 of the vehicle 801, 901, 1001 (see FIGS. 8, 9, and 10). For example, the first end 104 of the support arm can be adjacent to the roof surface 1002 of the vehicle while the second end 105 of the support arm can be adjacent to the rear door or window surface 1003 of the vehicle. The corner 1004 of the vehicle formed between the two surfaces is accepted into the substantially open space but does not come into contact with the vehicle load assist device. The substantially open space between the legs of the support arm allows the wheel assembly 120 to be positioned relatively close to the vehicle, making it easier to load the item 804 onto the vehicle. Additionally, the substantially open space allows the support arm to flex when an item is lifted onto the device. The slides in this embodiment 130, 131 allow the ends of the support arm to slide along and cushion the surface of the vehicle, and move relative to each other when the support arm flexes, avoiding damage to the vehicle surface, as well as adding stability. In contrast, if the ends of the support arm were fixed to the vehicle surface, for example, attached with suction cups, damage to the surface of the vehicle may occur or the device may tip over with a directional force on the pivot point.

Figure 1C:
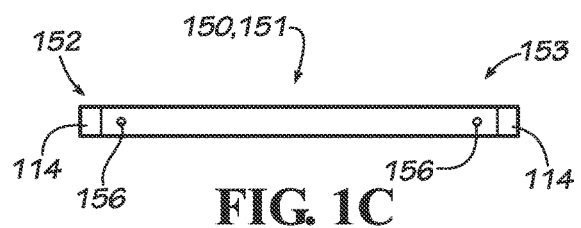
FIG. 1C is an elevational view of a transverse arm of a vehicle load assist device according to the embodiment of FIG. 1A.

When the vehicle load assist device 100 is in use, the slides 130, 131 are in contact with surfaces 802, 903, 904, 1002, 1003 of the vehicle 801, 901, 1001. In this embodiment, the slides include transverse arms 150, 151 having ends 152, 153 padding 132, and pad cover 134. In this embodiment, the slide is 16 inches long, 2½ inches thick, and extends the distance between the support arms 101, 102. As seen in FIG. 1C, each transverse arm is constructed from ⅞ inches diameter galvanized steel pipe or other rigid material that is 19 inches long measured along and between the ends of the transverse arm. The transverse arms also include a connection hole 156 located near each of the ends for connecting to the support arms. Each connection hole is positioned proximate to the ends of the transverse arm. In this embodiment, the connection holes are positioned 1 inch from the ends of the transverse arm, however in other embodiments, the connection holes can be positioned in other locations or absent as described below. The connection holes in the transverse arms are oriented parallel to each other and collinearly aligned to corresponding connection holes 112 in the support arms to allow the transverse arms and the support arms to be connected. The ends of the transverse arm can be covered. For example, plastic caps can be fitted over the ends or the ends can be dipped in a liquid or molten rubber or plastic material that solidifies when cool.

Figure 1D:
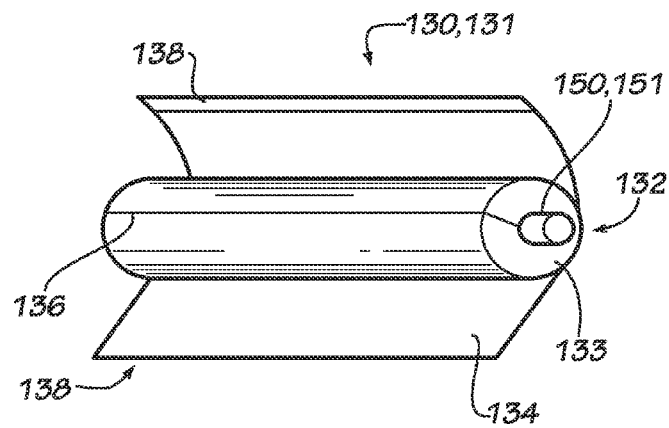
FIG. 1D is a perspective view of a slide of a vehicle load assist device according to the embodiment of FIG. 1A, with cover of the slide opened to illustrate the interior.

Referring now to FIG. 1D, the padding 132 in this embodiment is a foam tube 133 having a slit 136 along its entire length so that the foam tube can be attached to the transverse arm 150, 151 after coupling with the support arms 101, 102, or alternatively the foam tube is slid over the transverse arm prior to coupling with the support arms. The pad cover 134 is a cloth or fabric sheet with fasteners 138. In this embodiment, the fastener is a hook and loop fastener, for example, VELCRO (Velcro USA, Inc. of Manchester, N.H.), located along opposing edges so that the pad cover can be wrapped around and encase the padding. The fastener secures the pad cover in place. The portion of the slide 130, 131 in contact with the vehicle is made of soft and resilient materials to allow the device to slide and avoid damaging or scratching the vehicle during positioning and use.

Referring back to FIG. 1A, in this embodiment, the slides 130, 131 are coupled to the support arms via the two transverse arms. The transverse arms 150, 151 are coupled to the support arms 101, 102 at the ends 104, 105, 152, 153 using the connection holes 112, 156. One end 152 of transverse arm 150 is coupled to the first end 104 of one support arm 102 and the other end 153 of the transverse arm is coupled to the first end 104 of the other support arm 101. Similarly, one end 152 of transverse arm 151 is coupled to the second end 105 of one support arm 102 and the other end 153 of the transverse arm is coupled to the second end 105 of the other support arm 101. In this embodiment, the transverse arms and the support arms are coupled together with bolts 118. In other embodiments, the transverse arms and support arms can be coupled together in other fashions, as described below.

Referring still to FIG. 1A, the vehicle load assist device 100 also includes rotatable wheel assemblies 120 attached to the support arms 101, 102. In this embodiment, the rotatable wheel assembly includes a wheel 121, bearings 123, and an axle 125. The wheel is a 100 mm diameter polyurethane scooter or in-line skate wheel. The wheel is rotatably mounted onto an axle, a 5/16 inches steel bolt, with standard scooter, skateboard, or in-line skate bearings. Each support arm has one rotatable wheel assembly attached on the inside of the vehicle load assist device such that the wheel assemblies are facing one another and their rotational axes 126 are perpendicular to the plane 122 of the support arms (see FIG. 1E). However, it is also within the scope of the invention for the wheel assemblies 120' to be coupled to the support arms such that their rotational axes 126' are at a different angle to the plane of the support arms (see FIG. 1F) to accommodate, for example, a kayak or other load that has an angled bottom surface. Referring again to FIG. 1A, the wheel assembly is mounted to the support arm with a bolt 127 that fits through the wheel hole 110 in the support arm. Washers can be fitted on both sides of the rotatable wheel assembly to allow the wheel to roll smoothly.

Referring to FIGS. 1E, 1F and 8-10, the wheel 121, 121' of the rotatable wheel assembly 120, 120' has an outer surface 128, 128' that contacts the item 804 being loaded. The outer surface lies on the periphery of the wheel assembly and the area of contact with the item is a pivot point 129 for loading the item (see FIGS. 8, 9, and 10). Once the item is in contact with the wheel assembly, the item can be lifted up and pivoted on the wheel assembly while being rolled onto the roof rack system 803 of the vehicle 801, 901, 1001.

Figures 1E, 1F:
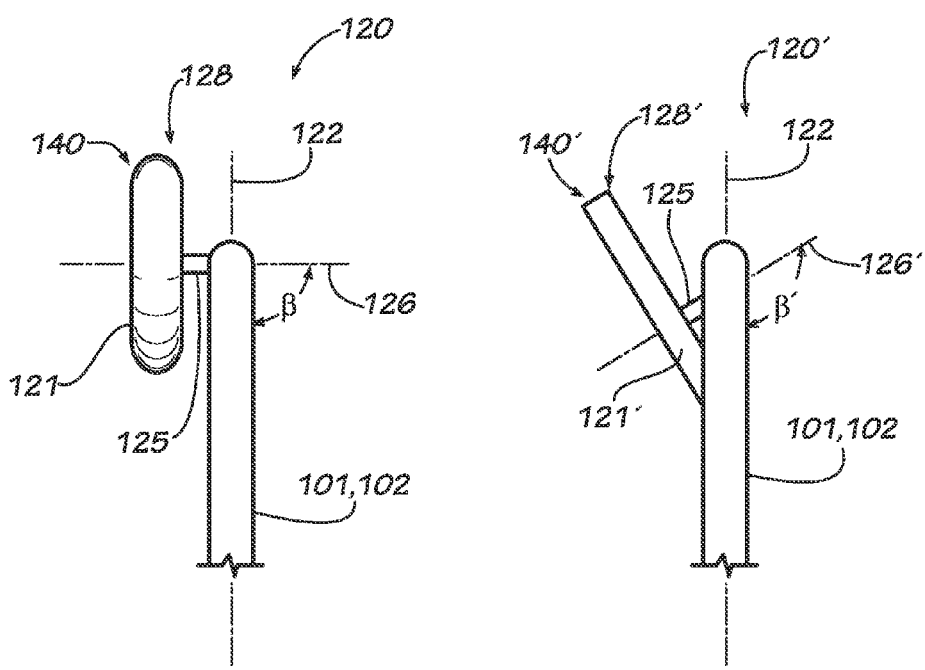
FIG. 1E is a partial elevational view of a wheel assembly and support arm of a vehicle load assist device according to the embodiment of FIG. 1A.
FIG. 1F is a partial elevational view of a wheel assembly and support arm of a vehicle load assist device according to an embodiment.

FIGS. 1E and 1F depict two embodiments of rotatable wheel assemblies 120, 120'. The wheel assembly of FIG. 1F has a wheel 121' with a flat contact area 140' at the periphery of the wheel assembly. Additionally, the axis of rotation 126' of the wheel assembly is not perpendicular to plane 122 of the support arm, but instead is at an angle β'. The wheel assembly of FIG. 1E has a wheel 121 with a rounded contact area 140 at the periphery of the wheel assembly. The axis of rotation 126 of the wheel assembly is perpendicular, or at an angle β of 90° to the plane 122 of the support arm. Other variations in the wheel assembly are within the scope of the present invention as described below, for example, a wheel with a rounded contact area can be at an angle relative to the plane of the support arm, or a wheel with a flat contact area can be perpendicular to the plane of the support arm.

Referring again to FIGS. 1A and 8-10, the vehicle load assist device 100 also includes harnesses 160, 161 for coupling to the vehicle 801, 901, 1001 during use. In this embodiment, the harnesses are a plurality of nylon webbing straps. As used herein, the term "plurality" means two or more. The harnesses include quick-release fasteners 162 having male 164 and female 166 portions that engage each other and can be positioned along the harness to vary its length. It should be clear that in use, one slide 130 is positioned closer, or proximal, to the roof rack system 803 of the vehicle 801, 901, 1001, while the other slide 131 is positioned further away, or distal, to the rack system. In this embodiment, two upper harnesses 160 are positioned at the proximal slide 130 and near the ends 104 of the support arms 101, 102 and an optional lower harness 161 is positioned at the distal slide 131. Each upper harness wraps around the proximal slide and the roof rack system 803, forming a loop and coupling the proximal slide and the roof rack system together when the quick-release fasteners are engaged, so that the load assist device is kept in place on the vehicle through gravity and the force exerted on the upper harnesses by the roof rack system 803. The optional lower harness is connected to a coupling device 168, such as a metal hook encased in resilient plastic, that can engage a vehicle at an edge of the vehicle's trunk or hatchback door. To couple the distal slide to the vehicle, the coupling device engages the vehicle, the optional lower harness is wrapped around the distal slide, the quick release fasteners are engaged, and the coupling device is cinched tight. It is also within the scope of the invention to exclude the lower harness and to allow the device to simply hang from the rack system from the upper harness.

Figure 2:
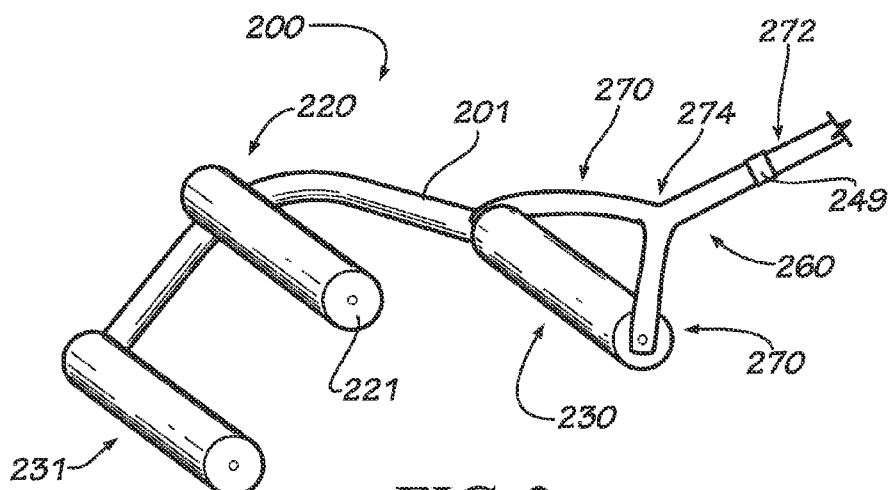
FIG. 2 is a perspective view of a second embodiment of a vehicle load assist device according to the present invention.

A second embodiment of the invention is shown generally at 200 in FIG. 2. This embodiment differs from the device 100 in several ways. Referring to FIGS. 2 and 8-10, while vehicle load assist device 100 includes two support arms 101, vehicle load assist device 200 includes one support arm 201. Additionally, the device 200 includes a rotatable wheel assembly 220 coupled to the support arm. The wheel assembly includes an elongated roller 221 upon which the item 804 being placed onto the vehicle 801, 901, 1001 pivots. In this embodiment, device 200 also includes two slides 230, 231 coupled on one side to the support arm 201. The device 200 further includes a harness 260. The harness differs from the harness 160 of device 100 in that it is Y-shaped. There are two portions 270 of the Y-shaped harness that couple to slide 230. These two portions join into a single unit 272 at a point 274 away from the slide. The Y-shaped harness can further include quick-release fasteners 162, buckles 249 for adjusting the length of the harness, hooks 168, and other attachments.

Figure 3:
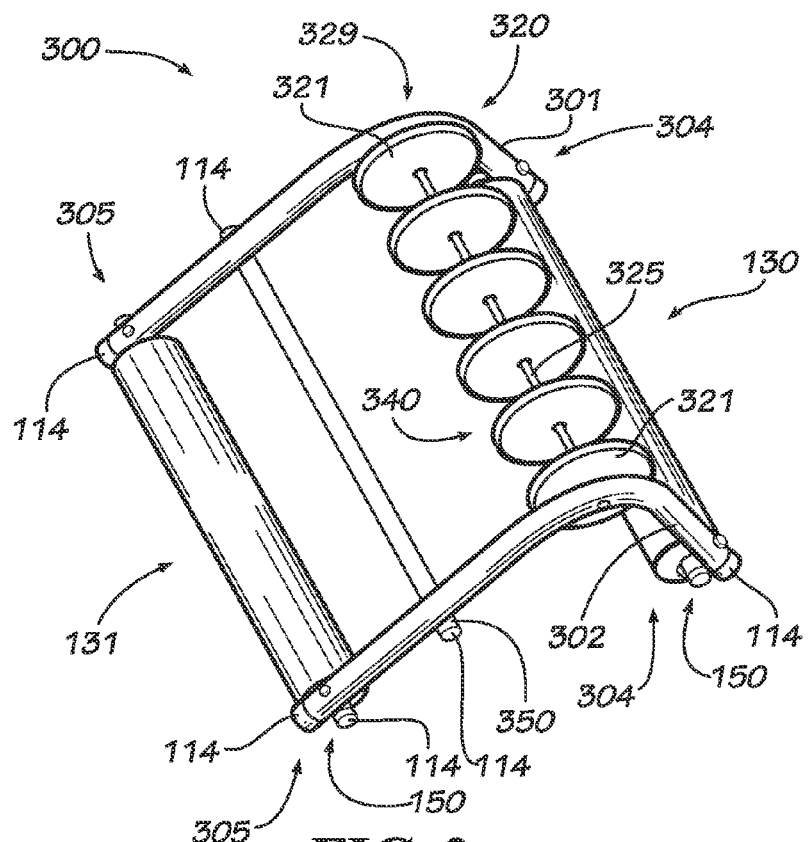
FIG. 3 is a perspective view of a third embodiment of a vehicle load assist device according to the present invention.

A third embodiment of the invention is shown generally at 300 in FIG. 3. Referring to FIGS. 3, and 8-10, vehicle load assist device 300 is generally similar to vehicle load assist device 100, but differs in several respects. Device 300 includes a rotatable wheel assembly 320 coupled to the support arms 301, 302 having ends 304, 305. As shown, the wheel assembly can include a common axle 325 upon which wheels 321 of the wheel assembly rotate. Each wheel may have a relatively flat contact area 340 at the periphery and is configured to contact the item 804 being loaded onto a vehicle 801, 901, 1001 at a rotatable pivot point 329. Additionally, device 300 includes a transverse arm 350 located between the ends 305 of the support arms and the wheel assembly. The transverse arm is coupled to both support arms and provides additional rigidity to the vehicle load assist device.

Figure 4:
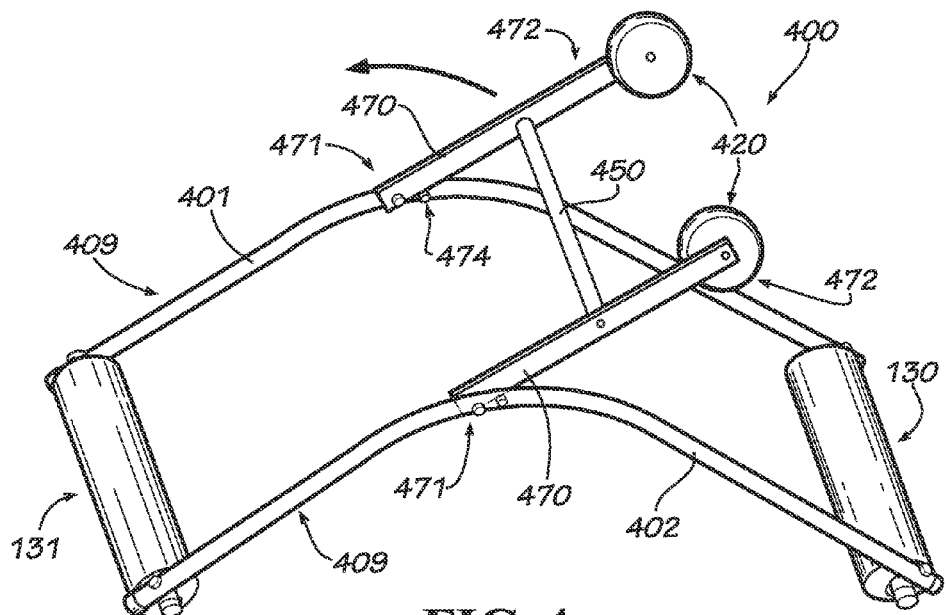
FIG. 4 is a perspective view of a fourth embodiment of a vehicle load assist device according to the present invention.

A fourth embodiment of the invention is shown generally at 400 in FIG. 4. The vehicle load assist device 400 is similar to vehicle load assist device 100, but differs in several respects. Device 400 includes two rotatable wheel assemblies 420 that are spaced away from the support arms 401, 402 by articulating arms 470. The articulating arms are attached to the support arms at one end 471 and to the wheel assemblies at the other end 472. The articulating arms attach to the support arms in a manner that allows the articulating arms to be adjusted relative to the support arms, for example, the articulating arms can be attached with bolts, nuts, and washers. In this embodiment, the device can include stops 474 that allow limited adjustment of the articulating arms in one direction, while allowing the articulating arms to be folded against legs 409 of the support arm in the other direction for compact storage. However, other embodiments can include one stop or no stops. Additionally, the articulating arms include transverse arms 450 attached for added rigidity and so that the articulating arms move as a unit. In other embodiments, the transverse arm 450 may be absent, or a plurality of transverse arms may be included.

Figure 5A:
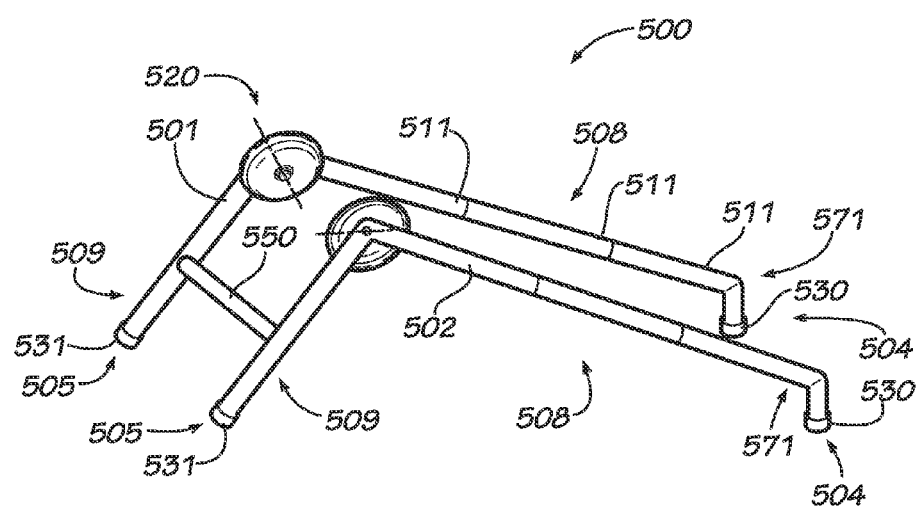
FIG. 5A is a perspective view of a fifth embodiment of a vehicle load assist device according to the present invention.
Figure 5B:
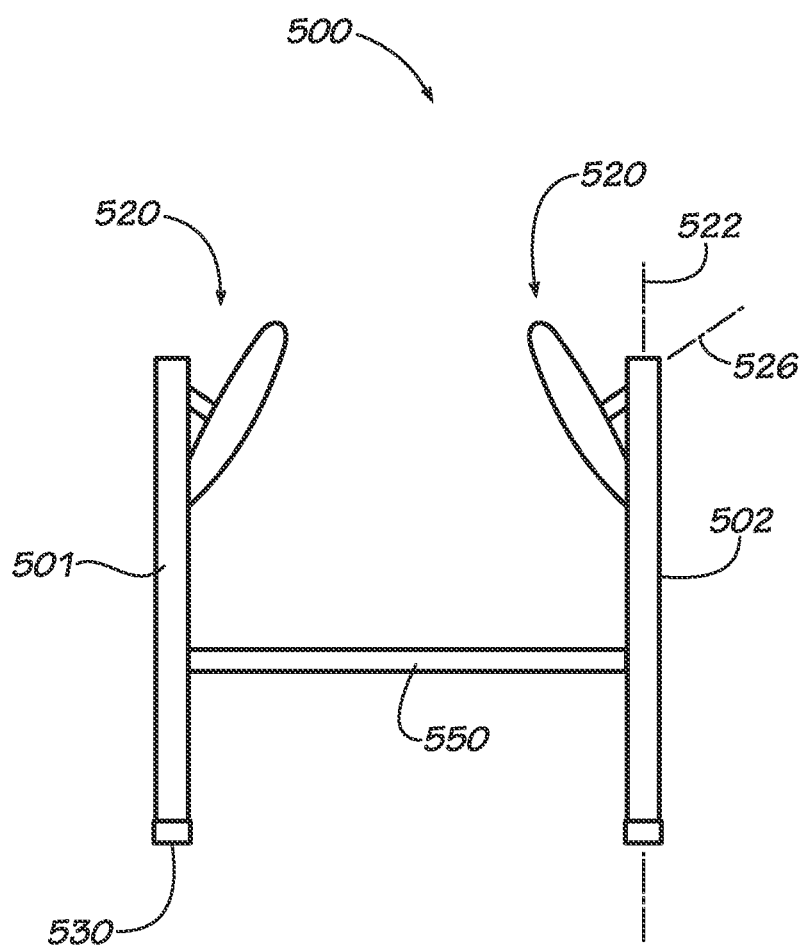
FIG. 5B is an elevational view of a vehicle load assist device according to the embodiment of FIG. 5A.

A fifth embodiment of the invention is shown generally at 500 in FIGS. 5A and 5B. The vehicle load assist device 500 is similar to vehicle load assist device 100, but differs in several respects. Device 500 includes a transverse arm 550 between corresponding legs 509 of the support arms 501, 502. The legs 508, 509 of the support arms in this embodiment include a general V-shaped portion, but also include additional angled portions 571 near the ends 504 of legs 508. In contrast to device 100, the transverse arm of device 500 is spaced away from the ends 505 of the support arms and is not included in a slide 130. This embodiment includes wheel assemblies 520. As seen in FIG. 5B, the wheel assemblies are located on the support arms. The axes of rotation 526 of the wheel assemblies are angled other than perpendicular to the plane 522 of the support arms. Referring back to FIG. 5A, the other legs 508 of the support arms are configured to be adjustable in length. Each leg 508 includes a series of tubes 511 that can be nested, for example, the diameters of the tubes can be sized such that the tubes slidably fit within each other. The length of the leg is adjusted by withdrawing a nested tube and fixing it at the desired length. There are a number of ways known in the art to form this type of telescoping leg. Additionally, the slides 530, 531 of device 500 are located at the ends of the support arm legs. In this embodiment, the slides include feet attached to the ends of the legs. The feet can be formed of rubber, padding and a pad cover, or other material that is designed not to damage the surface upon which the feet contact.

Figure 6:
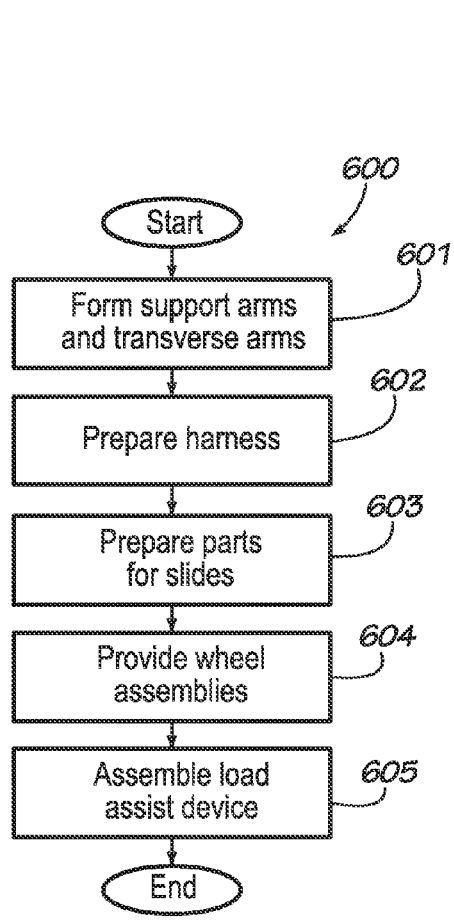
FIG. 6 is a flowchart schematically depicting one method that can be used according to the present invention to manufacture the vehicle load assist device of FIG. 1.

A flow chart for a method for manufacturing the vehicle load assist device 100 according to one embodiment is shown generally at 600 in FIG. 6 and includes the step 601 of forming the support arms 101, 102 and the transverse arms 150, 151 using methods known to those of ordinary skill in the art. The bend 106 in the support arms can be made using known bending methods such as ram bending or mandrel bending, or using a conduit or pipe bender, for example. The arms can be cut to the desired length prior to or after being bent. In this embodiment, galvanized steel pipe of ⅞ inches diameter is cut into 25.5 inches length for the support arms and 19 inches long for the transverse arms, but the dimensions may vary according to desired strength and size. Other materials can be used in other embodiments as described below. Alternatively, the arms can be cast directly into the shapes and lengths desired, or the arms can be assembled from smaller pieces that are screwed, bolted, welded, or slip fit together. Connection holes 112, 156 and wheel holes 110 are drilled into the appropriate arms and can be formed prior to, or after, the arms are bent or cut. The arms can be painted or otherwise finished to protect the arms from corrosion and provide a pleasing look to the vehicle load assist device.

Harnesses 160, 161 are prepared at step 602. In this embodiment, the harnesses are cut to a length of 9 feet and melted or hemmed at the ends to prevent unraveling. Quick release fasteners 162, and buckles 249 if desired, are added to the harnesses. A hook 168 is attached to one end of the lower harness 161. The hook is a standard J-shaped piece of metal coated in plastic or rubber, for example such as those found on bicycle racks that use straps to hook under a vehicle's trunk, hatchback, or rear door.

Parts for making the slides 130 are formed at step 603. Padding 132 is made from 2½ inches diameter polystyrene foam tubes 133 with a ⅞ inches diameter central hole. The foam tubes are cut to 16 inches in length and a slit 136 is formed along their length. A pad cover 134 is made from 600 denier polyester fabric cut into a rectangular shape measuring 16 inches long by 9 inches wide. Hook and loop fasteners 138 are sewn along the 16 inches long edges of the pad cover. Pre-assembled wheel assemblies 120, such as in-line skate wheel assemblies or custom formed wheels and bearings, are obtained in step 604.

Assembly of the vehicle load assist device is shown at step 605 and can be completed by the manufacturer or by the end user. A bolt 118 is used to couple one end 152 of a transverse arm 150 to one end 104 of a support arm 102 via the connection holes 112, 156 in each. A second support arm 101 is coupled to the other end 153 of the transverse arm 150 with a bolt through the connection holes in the ends of the arms in such a way that the two support arms are aligned with one another. Each end 152, 153 of a second transverse arm 151 is then coupled to the free ends 105 of the support arms 101, 102 with bolts.

The slides 130, 131 are assembled by sliding a transverse arm 150, 151 through a slit 136 in a foam tube 133, or alternatively sliding the transverse arm through the open center of the tube. A pad cover 134 is wrapped around the foam tube on the transverse arm and secured using the hook and loop fasteners 138. The lower harness 161 including the hook 168 is looped through and attached to the lower slide 131 and two upper harnesses 160 are looped through and attached to the upper slide 130. The loops in the harnesses are completed by engaging the quick-release fasteners 162.

Figure 7:
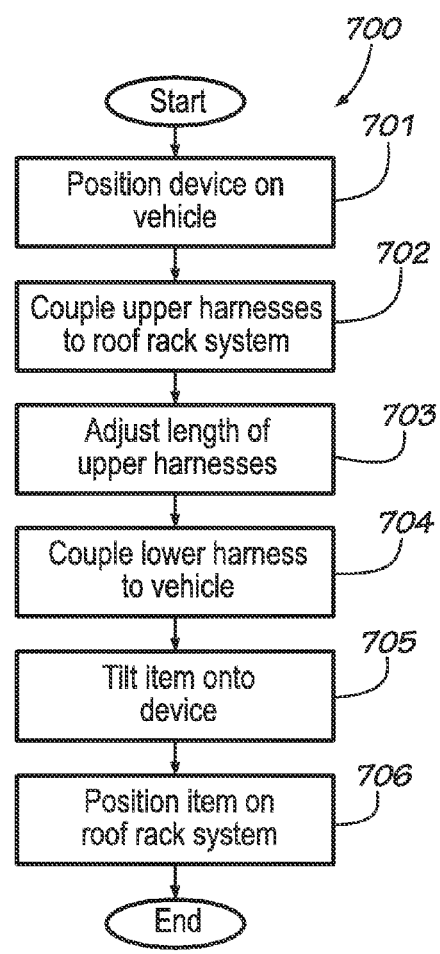
FIG. 7 is a flowchart schematically depicting one method that can be used according to the present invention to use the vehicle load assist device of FIG. 1.

A flow chart for a method for using the vehicle load assist device 100 in one embodiment of the invention is shown generally at 700 in FIG. 7. In a first step at 701, the vehicle load assist device is positioned on the vehicle 801, 901, 1001 (see FIGS. 8-10) with the upper slide 130 facing toward the roof rack system 803. In step 702, upper harnesses 160 are wrapped around a rack 807 of the roof rack system and secured using the quick release fasteners 162. In step 703, the length of the upper harnesses can be adjusted as needed using the quick release fasteners or buckles 249 to position the device at the desired location on the vehicle. At optional step 704, the lower harness 161 is coupled to the vehicle by hooking the hook 168 over the lip of the trunk 904 or hatchback door 802 of the vehicle and the length is adjusted using the buckle.

Once the vehicle load assist device 100 is in position on the vehicle 801, 901, 1001, the item 804 can be tilted up and the leading portion 805 of the item placed on the device to engage the wheel assembly 120 in step 705. The item is positioned onto the roof rack system 803 in step 706. To position the item onto the roof rack system, the trailing portion 806 of the item is lifted and the item pushed onto the vehicle and the roof rack system by rolling the item on the wheel assembly. After the center of gravity of the item has passed the wheel assembly, the item can be lowered onto the roof rack system. In some embodiments, the item can be further adjusted relative to the roof rack by lifting the leading portion of the item off the roof rack and pulling the item forward while engaging the wheel assembly. The item can be secured to the roof rack and the vehicle load assist device removed by reversing the attachment steps.

Since the shape of each support arm 101 defines a substantially open space 116 between the legs 108, 109 of the support arms 101, 102, the vehicle load assist device 100 can be conveniently placed on the vehicle 801. For example, on a hatchback-style of vehicle, as shown generally at 800 in FIG. 8, i.e., a vehicle with a relatively flat sloping back panel 802, the device can be placed anywhere along the surface of the back panel, allowing the device to be positioned close to the roof rack 803. On a sedan-style of vehicle 901 shown generally at 900 in FIG. 9, the upper and lower slides 130, 131 can contact two different surfaces of the vehicle that are angled relative to one another. The upper slide 130 can contact the surface of the rear window 903 and the lower slide 131 can contact the surface of the trunk 904, for example, allowing the corner between the rear window and the trunk to be spanned by the empty space between and defined by the legs of the support arms 101, 102. Depending on the position of the roof rack, the device can be placed at other locations on a sedan vehicle, such as the top of the trunk 904, spanning the trunk and rear surface 905 of the sedan vehicle, or spanning the roof 902 and the rear window, for example. On a van or SUV-style of vehicle, i.e., a vehicle 1001 having a rear door, shown generally at 1000 in FIG. 10, the device can be placed with the upper slide 130 positioned adjacent the surface of the roof 1002 and the lower slide 131 positioned adjacent the surface of the rear door 1003 or the window of the rear door. When the device is placed on different surfaces of the vehicle, for example the roof and the rear door of an SUV-style vehicle, the shape of the support arms allows the corner 1004 formed between the two surfaces of the vehicle to be accepted into the substantially open space without coming into direct contact with the support arms. Additionally, the substantially open space allows the support arms 101, 102 to flex and the slides to slide over the surfaces of the vehicle without causing damage and while maintaining stability without tipping.

Several embodiments of the present invention have been described above. Alternative embodiments can be constructed according to the following principles. The wheels of the wheel assemblies are rotational pivot points for loading an item onto the roof of a vehicle. As such, the wheels must be sufficiently spaced from the vehicle to prevent the item from contacting the vehicle except at the roof rack system. Thus, the radius of the bend in the support arms, the location of the bend, the length of the support arms, the diameter of the wheels, the thickness of the slide, and the positioning of the device on the vehicle determine the location of the contact point between the item being loaded and the vehicle load assist device relative to the vehicle. These parameters can be adjusted singularly or in combination such that the upper slide and the lower slide can be positioned adjacent the vehicle in such a way as to allow the item to contact the vehicle only via the roof rack system. In some embodiments, additional transverse arms can be coupled between the support arms for stability. The transverse arms can be located anywhere along the legs of the support arms or the bend. A transverse arm located at the bend can also be used as an axle or mounting bracket to support a plurality of wheel assemblies.

Other variations in the vehicle load assist devices described above are possible. For example, in other embodiments, the length of the support arm can range from approximately 20 inches to approximately 40 inches. In some embodiments the legs of the support arm have equal length, however, in other alternative embodiments, the legs can be of unequal length. Further, one or both of the legs can be variable in length, for example, by constructing a leg from telescoping tubes, the length of the leg can be varied. The telescoping legs can be set at a fixed length by well known methods, such as a pin and hole or threaded compression fittings. In other alternative embodiments, the support arm can be formed from interlocking sections, i.e., one section can slide into another section thereby coupling the two sections to form the support arm. The support arm can also be formed from multiple pieces that are screwed, bolted, or welded together. The diameter or thickness of the support arms can vary from approximately ¾ inches to approximately 1½ inches. In one embodiment the diameter of the support arms is ⅞ inches.

In some embodiments, the rounded bend is centered between the ends of the support arm, however, in other embodiments the rounded bend can be offset from the center toward either of the ends of the support arm. Alternatively, in other embodiments, the rounded bend can be angular instead of rounded. Additionally, the radius of curvature of the bend can range from approximately 0 inches, an angular bend, to approximately 6 inches. The angle α can be acute or obtuse and range from approximately 70 degrees to approximately 110 degrees. In other alternative embodiments, the support arm can be made of two legs hingedly coupled at the bend and the legs of the support arm can pivot at the bend such that the angle $\alpha$ is variable.

In some alternative embodiments, the wheel hole can vary in diameter from approximately ¼ inches to approximately 1 inch or the angle $\beta$, $\beta'$ with respect to the plane of the support arm can range from approximately 90 degrees to approximately 170 degrees. Furthermore, other embodiments include the wheel hole position offset from the middle of the support arm toward either the first end or the second end by approximately 5 inches to approximately 20 inches. In other alternative embodiments, the connection holes can vary in size, location, and angle with respect to the plane of the support arm. The connection holes can range from approximately ¼ inches to approximately ½ inches in diameter or located from approximately 5 inches to approximately 20 inches from the first and second ends of the support arm. Additionally, the connection holes on a support arm can be spaced differently from the first end and the second end or can vary from being parallel to the plane of the support arm. The shape of the connection holes and the wheel hole can be other than round, for example, the connection holes and wheel hole can be square.

In some embodiments, the support arms are constructed of ⅞ inches galvanized steel pipe. In other embodiments, the support arms can be constructed of any rigid metal, plastic, or composite material including steel, aluminum, galvanized steel, other metals and alloys, polyvinylchloride (PVC), high-density polyethylene (HDPE), acrylonitrile butadiene styrene (ABS), polypropylene (PP), polystyrene (PS), polycarbonate, carbon fiber composite, and other materials, for example, that when fabricated into a support arm can support the weight of an item being placed onto the roof of a vehicle without collapsing. The support arms can be fashioned from rods, bars, tubes, and pipes having a geometrical cross-section, such as circular, triangular, square, rectangular, pentagonal, and hexagonal, for example. In one alternative embodiment, the support arms are constructed of round aluminum tubes.

It should be understood that the support arms can be fashioned from unbent or linear materials by bending the material to the desired radius of curvature. Alternatively, the support arms can be formed bent, for example, by casting or injection molding, into the desired shape.

Suitable materials, shapes, and sizes for constructing the transverse arms are the same suitable materials, shapes, and sizes as for constructing the support arms. In some embodiments, the transverse arms are constructed of the same material as the support arms, for example, in one embodiment the transverse arms and support arms can be made of ⅞ inches round galvanized steel pipe. In alternative embodiments, the transverse arms can be constructed of different materials and shapes than the support arms, for example, in one embodiment the support arms can be constructed from ⅞ inches round galvanized steel pipe and the transverse arms can be constructed from ¾ inches square aluminum tube. In some alternative embodiments, a plurality of transverse arms can be coupled to a support arm.

In other alternative embodiments, the transverse arm can be curved, wavy, or have another configuration. Additionally, in some alternative embodiments, the transverse arm can vary in length from approximately 10 inches to approximately 30 inches. Furthermore, the transverse arm can vary in length by using telescoping tubes. In other alternative embodiments, the connection holes can be placed any distance from the ends of the transverse arm. Sizes and shapes for the connection holes can be the same as the connection holes in the support arms. Either the support arm or the transverse arm, or both, may have square holes in order to fit carriage bolts.

In some alternative embodiments, the slide can vary. In some embodiments, the slide is substantially straight, while in other embodiments, the slide can be curved, wavy, or have another configuration to disperse the weight of the item being loaded over a larger area. In some embodiments, the slide includes a transverse arm, while in other embodiments the slide is located at an end of a support arm. In other alternative embodiments, the padding is a foam tube that does not include a slit. Instead, a transverse arm may be slid through the opening in the tube before the transverse and support arms are coupled. In other alternative embodiments, a transverse arm can be included in a plurality of slides. The plurality of slides can be spaced along the transverse arm, or can be located toward the ends of the transverse arm leaving the central portion of the transverse arm exposed.

Other alternative embodiments can include a slide that is cushion-like. The slide can include a closed pocket made of fabric filled with padding. Alternatively, the padding can include a gel material. Materials useful for padding include open cell foams, closed cell foams, and pellets made from polyurethane, polystyrene, polypropylene, and silicones, for example, and fibrous materials such as cotton, wool, polyester, and nylon, for example. The padding material may be resilient to avoid damage to the vehicle during use.

In some embodiments, the pad cover that encases the padding can be woven or non-woven cloth, fabric, or plastics. Useful materials include cotton, nylon, vinyl, rubber, such as neoprene, and polyester, for example. The pad cover provides protection for the vehicle and the padding. In one embodiment, the pad cover is 600 denier polyester cloth. The pad cover can be in the form of a sheet that includes fasteners along opposite edges of the sheet. The sheet is sized to wrap around and cover the padding when fastened. In some alternative embodiments, the fasteners can be snaps, buttons, buttons and loops, buckles, straps and buckles, or hook and loop fasteners, for example. In other embodiments, the pad cover is in the form of a cylinder that fits over the padding. The ends of the cylindrical pad cover can include elastic or drawstrings, for example, to ensure the pad cover remains in place. In some embodiments, the pad cover can be adhered to the pad with glue or other adhesive materials, such as pressure sensitive adhesives or contact adhesives.

It should be understood that the length and diameter of the bolts used to connect a transverse arm to a support arm can vary depending on the choice of materials and the diameter of the connection hole. Similarly, the length and diameter of the bolts used to attach the wheel assembly to the support arm can vary depending on the choice of materials.

In some embodiments, bolts and nuts, or bolts and stop nuts, are used to couple the transverse and support arms and to attach the wheel assembly to the support arm. In alternative embodiments, other devices or methods of coupling can be used, for example screws, rivets, welding, gluing, hinges, soldering, or other suitable methods. Furthermore, in other alternative embodiments, the support arm, the transverse arm, or both can have cut-outs to allow improved overlap between the coupled arms, facilitating and strengthening the coupling. Arms may also be made with square holes in order to fit carriage bolts or other styles of self-locking bolts.

In alternative embodiments, the rotatable wheel assembly can include rotational devices, for example, wheels, casters, swivel casters, or rollers can be used. A caster is a rotatable wheel held within a yoke. A swivel caster allows the caster wheel to change its orientation such that the caster wheel aligns with the direction of rotation of the wheel. Rollers can distribute the weight of the item over a larger area, thereby reducing the possibility of damage to the item. Rollers can be supported on one end or both ends. Swivel casters can alter their orientation such that the caster can self align with the item to avoid scratching the item, which may be advantageous with items having a rounded surface. Additionally, a hinge with limited range can be used to allow the wheel, roller, or caster to change contact angle, improving contact area with the item. In some embodiments, the axis of rotation of the rotational device is perpendicular to the plane of the support arm, while in other embodiments, the axis of rotation can be angled other than perpendicular to the plane of the support arm. Each of the alternative rotational devices includes a wheel-like structure having an outer surface that contacts the item being loaded that forms a pivot point.

In other embodiments, the wheels, rollers, or casters can be made of rubber, polyurethane, foam, metal, wood, or any other resilient durable materials, or can be carbon fiber-based. The resiliency of the material prevents damage to the item as it is rolled onto the vehicle. Rotational devices of other diameters can also be used. The diameter of the rotational device can vary from approximately 40 mm to 200 mm, however, the diameter should be sufficiently large that the item does not touch the support arm as it is being loaded onto the vehicle, yet small enough that the rotational device freely rotates without binding on or touching the vehicle.

In some embodiments, each rotatable wheel assembly includes a single rotational device, such as a wheel, roller, or the like. In alternative embodiments, a wheel assembly can include multiple rotational devices. Additionally, the vehicle load assist device can include one or more wheel assemblies. In alternative embodiments having a single wheel assembly, the wheel assembly can be mounted on a single support arm or can span and be attached to two support arms. In one alternative embodiment, a plurality of wheel assemblies span and are attached to two support arms. In yet another alternative embodiment, a roller spans and is attached to two support arms. In further alternative embodiments, a plurality of wheel assemblies can be spaced along various locations of the support arms.

In some embodiments, the vehicle load assist device includes harnesses. In alternative embodiments, harnesses are absent. The harnesses can be constructed from straps, chains, cords, wires, cables, ropes, rigid metal bars, or other materials suitable for coupling to the vehicle, for example. Harnesses should be of a length sufficient to couple to the vehicle and position the vehicle load assist device at the desired location on the vehicle. Preferred lengths of the harness can vary from approximately 8 inches to approximately 36 inches. In some embodiments, the length of the harness can be greater than approximately 36 inches. In other embodiments, the length of the harness can be extended by using extension straps having a male connector on one end and a female connector on the other end that can engage the corresponding connector on the end of the harness. The harness length can be varied by using buckles or fastening devices that can be slidably positioned along the harness.

In some embodiments, upper harnesses wrap around the slide and the roof rack system to form a loop, while in other embodiments, upper harnesses wrap around a support arm and roof rack system or a transverse arm and the roof rack system to form a loop. In other alternative embodiments, one end of the upper harness can form a loop around the roof rack system and the other end of the upper harness can form a loop around the slide, a transverse arm, or a support arm. In yet other alternative embodiments, the device includes one harness. Either of the upper or lower harnesses can be Y-shaped, with the double-ended portion being coupled to slide, the support arm, or transverse arm. In some alternative embodiments the double-ended portion can be coupled to the roof rack or hooks. In yet other alternative embodiments, both ends of a harness can be Y-shaped. In some embodiments, the support arms or transverse arms can include a slit or hole that the harness can loop through.

The harnesses can be permanently affixed to the slides, support arms, or the transverse arms, or they can wrap around the slides, support arms, or the transverse arms for easy removal. The harnesses can be permanently affixed by sewing or riveting the harness into a loop around one of the slides, support arms, or transverse arms. In some other alternative embodiments, the upper harness can include a hook, carabiner, latch, or the like that engages the roof rack system, or the upper harness can wrap around the roof rack system and the hook engage the upper harness to form a loop. The hook can be C-shaped, J-shaped, or S-shaped, for example. Alternatively, the upper harnesses can be tied to the roof rack system. In some alternative embodiments, the lower harnesses can be absent.

All of the features disclosed in the specification, including the claims, abstract, and drawings, and all of the steps in any method or process disclosed, may be combined in any combination, except combinations where at least some of such features and/or steps are mutually exclusive. Each feature disclosed in the specification, including the claims, abstract, and drawings, can be replaced by alternative features serving the same, equivalent, or similar purpose, unless expressly stated otherwise. Thus, unless expressly stated otherwise, each feature disclosed is one example only of a generic series of equivalent or similar features.

The foregoing detailed description of the present invention is provided for purposes of illustration, and it is not intended to be exhaustive or to limit the invention to the particular embodiments disclosed. The embodiments may provide different capabilities and benefits, depending on the configuration used to implement the key features of the invention. Accordingly, the scope of the invention is defined only by the following claims.

I claim:

1. A vehicle load assist device for loading an article on top of a vehicle, the device comprising:
   at least one support arm having two ends;
   at least one wheel assembly coupled to the at least one support arm between the two ends, the wheel assembly including an outer periphery;
   at least one slide coupled to one end of the at least one support arm for slidably contacting said vehicle; and
   at least one harness coupled to the at least one support arm;
   wherein:
      the at least one support arm defines a substantially open space between the two ends sized to accept a corner of a vehicle, the outer periphery of the at least one wheel assembly is a pivot point; and
      the at least one harness is configured to couple to the vehicle; and
   wherein:
      the at least one wheel assembly includes a first wheel assembly and a second wheel assembly, each of the first and second wheel assemblies comprises:

an axle fixedly secured to and extending perpendicularly outward from the at least one support arm; and
a wheel rotatably mounted to the axle.

2. The vehicle load assist device of claim 1, wherein at least one of the at least one harness includes a hook.

3. The vehicle load assist device of claim 1, wherein the at least one wheel assembly is selected from the group consisting of wheels, casters, swivel casters, and rollers.

4. The vehicle load assist device of claim 1 further comprising at least one transverse arm coupled to the at least one support arm.

5. The vehicle load assist device of claim 4, wherein the at least one transverse arm is spaced a distance from the ends of the at least one support arm.

6. The vehicle load assist device of claim 4, wherein the slide includes at least a portion of the at least one transverse arm.

7. The vehicle load assist device of claim 1, wherein:
the at least one support arm includes at least one leg having a length; and
the length of the at least one leg is variable.

8. The vehicle load assist device of claim 1, wherein:
the at least one harness includes an end; and
the end of the at least one harness is substantially Y-shaped.

9. The vehicle load assist device of claim 1, wherein a first end of the at least one support arm is adapted for placement on a first surface of the vehicle and a second end of the at least one support arm is adapted for placement on a second surface of the vehicle; and wherein an edge of the first surface and an edge of the second surface meet to form the corner of the vehicle.

10. A vehicle load assist device for loading an article on top of a vehicle, the device comprising:
a first support arm having a first end and a second end;
a second support arm having a third end and a fourth end;
a first slide coupled between the first end of the first support arm and the third end of the support arm for slidably contacting the vehicle, the first support arm located in a first plane;
a second slide coupled between the second end of the first support arm and the fourth end of the support arm for slidably contacting the vehicle, the second support arm located in a second plane;
a first wheel assembly coupled to an interior of the first support arm between the first and second ends, the first wheel assembly comprising:
a first axle fixedly secured to and extending perpendicularly outward from the interior of the first support arm; and
a first wheel rotatably mounted to the first axle, the first wheel having a first outer periphery; and
a second wheel assembly coupled to an interior of the second support arm between the third and fourth ends, the second wheel assembly comprising:
a second axle fixedly secured to and extending perpendicularly outward from the interior of the second support arm; and
a second wheel rotatably mounted to the second axle, the second wheel having a second outer periphery
wherein:
the first support arm defines a first substantially open space between the first and second ends sized to accept a corner of a vehicle, the outer periphery of the first wheel assembly is a first pivot point; and
the second support arm defines a second substantially open space between the third and fourth ends sized to accept the corner of the vehicle, the outer periphery of the second wheel assembly is a second pivot point.

11. The vehicle load assist device of claim 10, further comprising a first harness coupled to the first slide, the first harness is configured to couple to the vehicle.

12. The vehicle load assist device of claim 11, further comprising a second harness coupled to the second slide, the second harness is configured to couple to the vehicle.

13. The vehicle load assist device of claim 10, where the at least one support arm lies in a plane.

14. The vehicle load assist device of claim 13, wherein the first wheel assembly rotates about a first rotational axis and the second wheel assembly rotates about a second rotational axis.

15. The vehicle load assist device of claim 14, wherein the first and second rotational axes are perpendicular to the plane.

* * * * *